Patented Mar. 23, 1943

2,314,459

UNITED STATES PATENT OFFICE 2,314,459

DRY STARCH PRODUCT

August Adolph Salzburg, London, England, assignor to Dryfood Ltd., London, England, a limited liability company of Great Britain No Drawing. Application April 15, 1939, Serial No. 268,023. In Germany April 20, 1938

9 Claims. (Cl. 99—139)

The present invention relates to starch products suitable for the preparation, with cold water and without heating, of blancmanges, puddings, creams, custards and sauces. It is particularly concerned with dry preparations which may contain besides starch, certain additions and which, when stirred with cold water, will form suspensions which within a few minutes form jellies which can be cut with a knife and have the consistency, solidity and stability required of a blancmange.

It is well known that green (natural) starch swells in hot water. Potato starch, when treated (boiled) with hot water, forms after cooling a tough stringy sticky paste, which is not brittle. The same applies to starch from other tubers, such as arrowroot starch. Stem starches such as sago starch behave similarly, although they form considerably less viscous liquors when boiled with hot water. In contradistinction thereto, the starches of cereals, for instance maize starch, wheat starch, rye starch and rice starch, when boiled with water and cooled, are converted into jellies possessing all those properties which are characteristic of blancmange, in that they are stable and elastic and can be cut with a knife, from which they can readily be detached.

Apparently a jelly possesses the solidity, stability and elasticity required in a blancmange only if during solidification a kind of skeleton is formed within the gel substance by the non-hydrolysed parts of the starch-granules, e. g. the envelopes of the granules, and supports the hydrolysed part of the gel. While potato starch and other starches of similar constitution show a tendency to swell too far and to be reduced to a shapeless mass, maize starch swells much more slowly and only at higher temperature, and after the swelling process some of the original granular matter, probably the envelopes of the starch granules, form the elements from which the gel skeleton is being built up. Other cereal starches such as wheat starch and rice starch undergo a similar conversion; they swell readily, but not too far, and therefore deserve the name of natural blancmange-forming starches. Rye starch behaves similarly, but it may in some cases impart to the dry preparation an undesirable taste or flavor.

I have now found that it is possible to produce from natural blancmange-forming starches dry preparations which, when mixed with cold water, solidify to form a blancmange-like jelly. It is surprising that these starches, when converted into such dry preparations, retain their favourable limited swelling capacity which enables the skeleton mentioned above to be built up.

I have found that such dry preparations can be prepared by first reducing the starch to a paste with hot water, and thereafter drying the paste by a process which leaves unchanged the physical structure of the starting material, so that the dried product, on taking up water again, will swell and in swollen condition will be identical with the swollen starch (paste), which was subjected to the drying process. The paste prepared with hot water may for instance be subdivided and dried in this state of fine subdivision. Preferably the paste, which, besides starch and water, may contain additional matter, is atomized and rapidly dried at a moderately raised temperature.

The reduction of the starch to a paste (pastification) should be carried out at a temperature below 100° C. and preferably within the range of 73–88° C. Within this range of temperatures there exists for each kind of starch an optimum temperature for pastification, at which a paste is obtained resulting in a dry preparation which, when mixed with cold water, forms a blancmange-jelly possessing the optimum solidity and stability. If reduction of a starch is effected at a higher or lower temperature than this optimum temperature, the solidity and stability of the jelly forming the blancmange will as a rule be inferior.

With maize starch the optimum temperature is at or near 78° C., i. e. somewhat below the temperature at which this starch is completely pastified, i. e. the temperature at which the starch molecule will take up and bind the largest possible proportion of liquid and the starch granules, while being swollen to the point at which they are about to burst, in their great majority still have retained a recognizable individual shape and have not yet released their contents of amylose. With wheat starch the optimum temperature of 88° C. is also the temperature at which complete pastification takes place. The difference between the two cases is due to the fact that wheat starch, being less readily pastified, must be heated up to complete pastification and that the danger of too far reaching swelling and bursting of the starch granules with consequent loss of the property of forming on solidification a stable jelly does not exist. The temperature best suited for the formation of a satisfactory paste from rice starch is 78° C., similar as in maize starch. In all cases the conversion of the starch into a paste must be effected with relatively large quantities of water also in order to obtain a sufficiently easily flowing paste or a paste which can at least be fed to the atomizer or spraying device by means of a pump. In the case of maize starch which requires about the four-fold quantity of water, relative to the weight of the starch, in order to swell completely, a proportion of 6–15 parts by weight of the starch per 100 parts by weight of the liquid (for instance water) has been found to be suitable. Higher concentrations may be useful if the paste is fed to the spraying device under increased pressure. For instance at a concentration of 10 parts starch and 100 parts liquid a paste is formed, which can easily be fed to a spray-drying device by pumping.

Since it is frequently desirable to add to the dry preparation during manufacture additional substances, for instance sugar, cocoa, milk, fruit-juices and the like, it will in certain cases be recommendable to add these substances to the paste before it is dried. In that case the physical properties of the paste may be changed to such an extent that it may become advisable to operate with a different concentration. Thus for instance an addition of milk instead of water will increase, the addition of cane sugar will reduce the viscosity of the paste. Other kinds of sugar, for instance glucose, fructose and arabinose, act similarly to cane sugar. An addition of non-pastified meals, for instance cocoa meal, renders the paste mixture more supple, thus bringing forth a similar change as a reduction of the viscosity. If additions are made which reduce viscosity, the percentage of starch in the mixture may be increased. On the other hand, if viscosity raising materials are added, a lower concentration of the starch may be chosen in order that the paste can easily be fed to the dryer and atomized therein.

For instance in order to keep up the easy flow of a paste obtained from about 7 kilos maize starch and 100 litres water, if whole milk is added, the percentage of starch should be reduced to about 5.4 kgs. per 100 litres. In order to obtain the desirable proportion of starch to milk albumen, such a paste may for instance be prepared from 1.35 kgs. starch, 15 litres whole milk and 10 litres water, the maize starch being stirred with the water to form a suspension and the whole milk being added thereafter. A paste prepared from 1.35 kgs. starch, 1.50 kgs. sugar, 0.275 kg. cocoa, 10 litres water and 15 litres whole milk by first boiling the cocoa in water, then adding the sugar, and then the whole milk and the maize starch showed the same degree of easy flow. When the paste is fed to the dryer by pumping, it may be formed from 1.35 kgs. starch, 215 kgs. sugar, 0.32 kg. cocoa and 10 litres water, in which case it contains more than 28 per cent by volume of starch and other constituents. In certain cases the content of dry substances may be raised to 40–50 per cent by volume.

A relatively higher starch concentration must be chosen if fruit-juices are mixed with the paste, since this causes a decomposition of the starch during the production of the preparation and this decomposition will probably continue in the finished dry preparation. Such preparations therefore do not possess the practically unlimited stability of those which besides starch contain milky substances as well as cocoa and albumen.

Before the paste is fed to the drying apparatus, it may first be homogenized in a homogenizing apparatus in order to reduce its degree of viscosity. Homogenization may at the same time increase the suppleness of the paste, but in order to attain this the paste must be prevented from cooling. As a rule it will suffice if the paste is not allowed to cool below about 40–50° C. If it has been homogenized, it is recommended to maintain the temperature, at which pastification has taken place, until drying commences.

I have found that subdivision of the paste about to be dried is preferably effected by spraying or atomization into air heated to from 50 to 150° C. I may for instance spray the flowing mass by means of a rapidly rotating disc into a current of hot air and cause the dried particles to be removed from the drying zone at a controllable speed. The properties of the jelly which forms the pudding, depend on the fact that the paste is dried in its finest subdivision, giving an optimum surface area to the powder thus obtained, which enables it to swell in cold water and to form a blancmange-jelly. On principle, any drying method may be used which evaporates the water in fractions of a second and results in the formation of a powder, the particles of which possess a sufficient surface area, thus enabling the powder mixed with cold water to form a blancmange-jelly. This property of swelling is not attained if starch paste is dried comparatively slowly in scales or lumps and ground after drying. My investigations have however shown that if a starch paste, which is obtained by treating a natural jelly-forming starch at a temperature below 100° C. with a quantity of water such that the resulting paste is easy flowing or can be conveyed by pumping, is dried in a state of fine subdivision, the resulting dry preparation, when subsequently brought in contact with and after having adsorbed, water, will practically be the same product as before the drying. Thus the dehydration process, carried through when drying such a paste under conditions of fine subdivision, is reversible in that it does not change the constitution of the material except by expulsion of water, so that the dry preparation can be reconverted into the starting product by taking up water, i. e., by simple hydration. This fact is characteristic of the new process as distinguished from the drying of the paste under mechanical action, for instance by compressing the product between heated metal surfaces or by spreading it on heated cylinders. Such drying methods have been used for instance in the production of potato flakes, but, if applied to starch pastes, would not lead to the formation of preparations fit for conversion with cold water into blancmange-jellies.

The drying temperature of the paste particles should not exceed the temperature at which the paste is prepared, lest the paste particles might be injured and particular care should be taken to avoid contact of the atomized paste droplets with an air current at a temperature such that charring of the paste might arise or the sugar present in the starch might undergo caramelization.

In certain cases a drying temperature as low as 50–70° C. will be suitable.

When mixing about 11.3 to 15 parts of the dry preparation thus produced from maize starch with 100 parts cold water, a blancmange is obtained, in which the solidity and stability of the jelly is about equal to that of a blancmange produced by mixing 9 parts of the ordinary kind of blancmange starch with 100 parts of boiling water. If a higher percentage of water is mixed with the dry preparation creams, custards or sauces are formed instead of blancmange.

In the preparation of blancmanges from the cold-swelling dry preparations, especially if they are produced from maize or rice starch, lumps may form on the addition of water. This drawback can easily be avoided by mixing the dry preparation with a finely subdivided soluble solid carbohydrate, for instance with finely powdered sugar which acts as a wetting agent for the cold water or milk. A mixture of 100 kgs. of a maize starch dry preparation with 40 kgs. powdered sugar has been found to be suitable. Similar additions also act favourably in dry preparations which contain besides starch, milk, cocoa and other suitable ingredients. Wheat starch preparations as a rule do not require the addition of a solid carbohydrate since they do not tend to form lumps. Sugar added to the paste before drying also acts as a wetting agent.

In practicing my invention, I may for instance proceed as follows:

*Example 1.*—0.275 kg. cocoa are boiled in water and cooled by adding 10 litres whole milk. 1.35 kgs. maize starch are stirred with 15 litres milk. The suspensions of cocoa and starch are mixed with 10 litres water, and the mixture is heated to 78° C., whereby a paste is formed, which is then spray-dried with air of 94° C. The dry powder obtained in this operation is mixed with 1.9 kgs. powdered sugar.

*Example 2.*—0.49 kg. cocoa and 0.81 kg. sugar are boiled in 10 litres water and the suspension cooled by adding 20 litres water. 4.08 kgs. maize starch are stirred with 27 litres water, the two suspensions are mixed and the mixture heated to 78° C. The paste thereby obtained is spray-dried with air heated to 150° C. The dry powder obtained in this operation is intimately mixed with 3.74 kgs. powdered sugar. The mixture is divided in two halves. One half is intimately mixed with 86.71 grams tartaric acid, the other half with 97.29 grams bicarbonate of soda. The two mixtures are then intimately mixed with each other.

*Example 3.*—0.324 kg. cocoa and 0.405 kg. sugar are boiled in 10 litres water and cooled by adding another 10 litres water. 1.814 kgs. maize starch are stirred in 7.5 litres water and mixed with the cocoa suspension, the mixture then being heated to 80° C. whilst stirring, to form a paste which is then spray-dried with air heated to 150° C. To the powder thus obtained are admixed 1.67 kgs. powdered sugar. To one half of this mixture are added 39.59 grams tartaric acid, to the other half 44.41 grams bicarbonate of soda and the two halves are then mixed again.

*Example 4.*—To 1.36 kgs. rice starch are added 0.6 kg. sugar and the mixture is stirred with 27.25 litres water. The mixture is heated to 78° C. and stirred to obtain a paste, which is then spray-dried with air heated to 130° C. To the powder resulting in this operation 700 grams powdered sugar are admixed.

*Example 5.*—5.445 kgs. wheat starch and 1.134 kgs. sugar are stirred into 54.5 litres water. The suspension thus obtained is heated to 88° C. in order to form a paste, which is then spray-dried with air heated to 140° C. The fine powder resulting in this operation is mixed with 4.3 kgs. finely powdered sugar.

The preparations made from wheat starch have been found to be at least equal and in higher concentrations even superior, to preparations made from maize starch as far as the solidity of the jelly is concerned. This is rather surprising in view of the fact that wheat starch jellies prepared with boiling water are greatly inferior in quality to maize starch jellies.

Other materials, for instance cut, dried and ground fruit, preferably in the form of flakes formed from fruit pulp, or powder obtained by drying fruit-juices or fruit pulp may be admixed to the dry preparation.

The consistency, moulding and wetting capacity and taste of blancmanges prepared from the dry products according to this invention can be considerably improved by the introduction of an inert gas or a compound developing such gas, as for instance bicarbonate of soda and tartaric acid, added to the dry preparation. The constituents of a gas-developing mixture may also be admixed separately to different portions of the paste about to be dried. For instance from 2 to 8 per cent of such compounds, calculated on the starch, may be added.

It may be useful to emphasize the fact that in contrast with other processes of preparing cold-water swelling starch, in which starch is mixed with cold water in about equal proportions and dried by spraying at a high temperature, the present process does not include the step of drying starch suspended in cold water. In the present process the starch is heated in water to swell at the temperature optimum specific for this particular starch which ranges between 73–88° C. This imparts to the paste the particular property of forming, after drying, with cold water a jelly of a solidity and stability such as required in a blancmange or a pudding. In this process no decomposition of the starch takes place. The process is a two-stage process in that the starch is first reduced to a paste by heating it with water to a predetermined temperature between 73 and 88° C., and then drying this paste, preferably by spraying or atomizing with warm air, in such manner as to produce a finely subdivided powder having the large surface area which enables this powder to swell with cold water and to yield a jelly of the consistency, solidity and stability required of a pudding or blancmange which can be cut with a knife and can easily be detached therefrom.

Various changes may be made in the details disclosed in the foregoing specification without departing from the invention or sacrificing the advantages thereof.

I claim:

1. The method of producing cold-swelling preparations from blancmange- or pudding-forming starch which comprises treating the starch at a temperature ranging between about 73° C. and 100° C. for conversion into a paste with about 6 to 15 parts water per 1 part starch and drying this paste in a state of fine subdivision.

2. The method of claim 1, in which maize starch is converted into a paste at about 78° C.

3. The method of claim 1, in which rice starch is converted into a paste at about 78° C.

4. The method of claim 1, in which wheat starch is converted into a paste at about 88° C.

5. The method of claim 1, in which the paste is sprayed, for drying purposes, into a hot air current having a temperature ranging between about 50 and 150° C.

6. The method of claim 1, in which there is added to the paste, before it is dried, a substance having viscosity-reducing properties.

7. The method of claim 1, in which there is added to the paste, before it is dried, a pulverulent substance having suppleness-increasing properties.

8. The method of claim 1, in which the paste is homogenized, before being dried, and the temperature, at which the starch is reduced to a paste, is substantially maintained until the drying process starts.

9. The method of producing cold-swelling preparations from blancmange-forming starch which comprises treating the starch at a temperature ranging between about 73° and 88° C. for conversion into a paste with about 6 to 15 parts water per 1 part starch and drying this paste in a state of fine subdivision.

AUGUST ADOLPH SALZBURG.